(12) United States Patent
Houston et al.

(10) Patent No.: US 9,424,099 B2
(45) Date of Patent: Aug. 23, 2016

(54) METHOD AND SYSTEM FOR SYNCHRONIZATION OF WORKITEMS WITH DIVERGENT CONTROL FLOW

(71) Applicant: Advanced Micro Devices, Inc., Sunnyvale, CA (US)

(72) Inventors: Michael C. Houston, Cupertino, CA (US); Benedict R. Gaster, Santa Cruz, CA (US); Lee W. Howes, Santa Clara, CA (US); Michael Mantor, Orlando, FL (US); Dominik Behr, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 335 days.

(21) Appl. No.: 13/672,291

(22) Filed: Nov. 8, 2012

(65) Prior Publication Data

US 2013/0326524 A1    Dec. 5, 2013

Related U.S. Application Data

(60) Provisional application No. 61/654,664, filed on Jun. 1, 2012.

(51) Int. Cl.
*G06F 9/46* (2006.01)
*G06F 9/52* (2006.01)

(52) U.S. Cl.
CPC . *G06F 9/52* (2013.01); *G06F 9/522* (2013.01)

(58) Field of Classification Search
None
See application file for complete search history.

(56) References Cited

U.S. PATENT DOCUMENTS

| | | | |
|---|---|---|---|
| 7,353,369 B1 | 4/2008 | Coon et al. | |
| 7,543,136 B1 | 6/2009 | Coon et al. | |
| 7,617,384 B1 * | 11/2009 | Coon et al. | 712/220 |
| 7,761,697 B1 * | 7/2010 | Coon et al. | 712/233 |
| 7,877,585 B1 * | 1/2011 | Coon et al. | 712/233 |
| 8,112,614 B2 * | 2/2012 | Nickolls et al. | 712/22 |
| 8,381,203 B1 * | 2/2013 | Beylin et al. | 717/150 |
| 2009/0259996 A1 * | 10/2009 | Grover et al. | 717/136 |
| 2011/0072249 A1 * | 3/2011 | Nickolls et al. | 712/234 |
| 2011/0078690 A1 * | 3/2011 | Fahs et al. | 718/102 |
| 2011/0087860 A1 * | 4/2011 | Nickolls et al. | 712/22 |
| 2012/0096474 A1 * | 4/2012 | Jiao | 718/107 |
| 2013/0061027 A1 * | 3/2013 | Chen et al. | 712/234 |
| 2013/0305021 A1 * | 11/2013 | Grover et al. | 712/214 |

FOREIGN PATENT DOCUMENTS

GB    2458556 A    9/2009

OTHER PUBLICATIONS

International Search Report for International Application No. PCT/US2013/043394, European Patent Office, Netherlands, mailed on Sep. 9, 2013.

* cited by examiner

*Primary Examiner* — Dong Kim
(74) *Attorney, Agent, or Firm* — Volpe and Koenig, P.C.

(57) ABSTRACT

Disclosed methods, systems, and computer program products embodiments include synchronizing a group of workitems on a processor by storing a respective program counter associated with each of the workitems, selecting at least one first workitem from the group for execution, and executing the selected at least one first workitem on the processor. The selecting is based upon the respective stored program counter associated with the at least one first workitem.

24 Claims, 5 Drawing Sheets

```
int s_test;
barrier v_bar[];
int v_pc[];

int find_lowest_runnable_PC(int ref_PC)
{
        s_test = MAX_INT;

for(i=0; i<WAVE_SIZE; i++)
        {
                if(v_pc[i] >ref_PC && v_pc[i] < s_test)
                {
                        if( v_bar[i] == NULL || v_bar[i].waitcount == 0 || v_bar[i].waitcount
== v_bar[i].barriersize)
                        {
                                s_test = v_pc[i];
                        }
                }
        }
        return s_test;
}
void reschedule()
{
        int s_jumpPC = 0;
        while( s_jumpPC != MAX_INT)
        {
                s_jumpPC = find_lowest_runnable_PC(s_jumpPC);
                if(s_jumpPC != MAX_INT)
                {
                        mask = s_jumpPC & v_pc;
                        setmask(mask);
                        jump s_jumpPC;
                }
                else
                {
                        sleep();
                }
        }
}
```

FIG. 2

METHOD AND SYSTEM FOR SYNCHRONIZATION OF WORKITEMS WITH DIVERGENT CONTROL FLOW

CROSS REFERENCE TO RELATED APPLICATIONS

This application claims the benefit under 35 U.S.C. §119 (e) of U.S. Provisional Appl. No. 61/654,664, filed Jun. 1, 2012, which is hereby incorporated by reference in its entirety.

BACKGROUND

1. Field of the Invention

The present invention relates generally to workitem synchronization.

2. Background Art

Graphics processing units (GPU) generally comprise multiple processing elements that are ideally suited for executing the same instruction on parallel data streams, as in the case of a single instruction multiple data (SIMD) device or in data-parallel processing. In many computing models a central processing unit (CPU) functions as the host or controlling processor and hands-off specialized functions, such as graphics processing, to other processors such as GPUs.

Multi-core CPUs, where each CPU has multiple processing cores, offer processing capabilities for specialized functions (e.g., graphics processing) similar to those available on a GPU. One or more of the computation cores of multi-core CPUs or GPUs can be part of the same die (e.g., AMD Fusion™) or, alternatively, in different dies (e.g., Intel Xeon™ with NVIDIA GPU). Recently, hybrid cores having characteristics of both CPU and GPU (e.g., AMD Accelerated Processing Units (APUs), CellSPE™, Intel Larrabee™) have been proposed for general purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets.

Several frameworks have been developed for heterogeneous computing platforms that have CPUs and GPUs. These frameworks include BrookGPU by Stanford University, the compute unified device architecture (CUDA) by NVIDIA, and OpenCL by an industry consortium named Khronos Group. The OpenCL framework offers a C-like development environment which users can create applications for the GPU. OpenCL enables the user, for example, to specify instructions for offloading some computations, such as data-parallel computations, to a GPU. OpenCL also provides a compiler and a runtime environment in which code can be compiled and executed within a heterogeneous computing system.

The computing model embodied by OpenCL, CUDA and many low level GPU intermediate languages is sometimes referred to as a single instruction multiple thread ("SIMT") processing. In a frequently used implementation of the SIMT model, SIMD execution using hardware mask sets on vectors is used to simulate threading to a finer grain than what is available in the hardware.

In order to efficiently utilize computing models where the CPU and the GPU can both be used for the execution of many types of code, more flexible thread synchronization models are needed. The conventional workitem synchronization available in OpenCL, for example, may be less efficient when used with workitems that are not traditional graphics processing tasks. For example, whereas respective concurrent workitems in a graphics processing task may not often synchronize after diverging, in CPU associated applications, synchronization may be relatively higher. The synchronization model provided in OpenCL, by itself, is inadequate to handle such dynamic behavior of workitems.

In OpenCL, workitems within a workgroup can be synchronized. Within a workgroup, a barrier instruction can be issued with the semantics that all workitems in the workgroup must reach the barrier before any can proceed past the barrier. A "barrier" blocks all processes that reach it until the semantics noted above is satisfied. It then releases the blocked processes to resume their respective processing. However, in OpenCL and other similar conventional frameworks, barrier use in control flow is heavily restricted. In particular, when the control flow diverges between workitems of the same workgroup, synchronization between the workitems may fail.

For example, calling a library function that includes a barrier instruction from a kernel having a conditional, in which one of the conditionals does not have a call to the function, may lead to deadlock. This is because, while the barrier would release only when all workitems of a group have reached it, a workitem for which a condition is not fulfilled, would not reach the barrier at all. These restrictions limit the ability of the system and the programmer to optimally utilize processing resources.

SUMMARY OF EMBODIMENTS

Methods and systems for more efficient and flexible scheduling of workitems are disclosed. A technique is disclosed for synchronizing by using program counters of respective workitems to schedule the execution of each group of one or more workitems. The technique can be used in processor architectures such as, but not limited to, vector processors, SIMD processors, and processors including scalar and vector units. The disclosed technique yield substantial advantages in improved processing efficiency and flexibility in programming. In particular, the disclosed technique allows the execution of multiple instruction multiple data (MIMD) style applications on SIMD processors The disclosed method, system, and computer program product embodiments include synchronizing a group of workitems on a processor by storing a respective program counter associated with each of the workitems, selecting at least one first workitem from the group for execution, and executing the selected at least one first workitem on the processor. The selecting is based upon the respective stored program counter associated with the at least one first workitem.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings:

FIG. 2 illustrates a rescheduling (in pseudo code) for workitems, according to an embodiment of the present invention.

DETAILED DESCRIPTION OF EMBODIMENTS OF THE INVENTION

Figure 1:
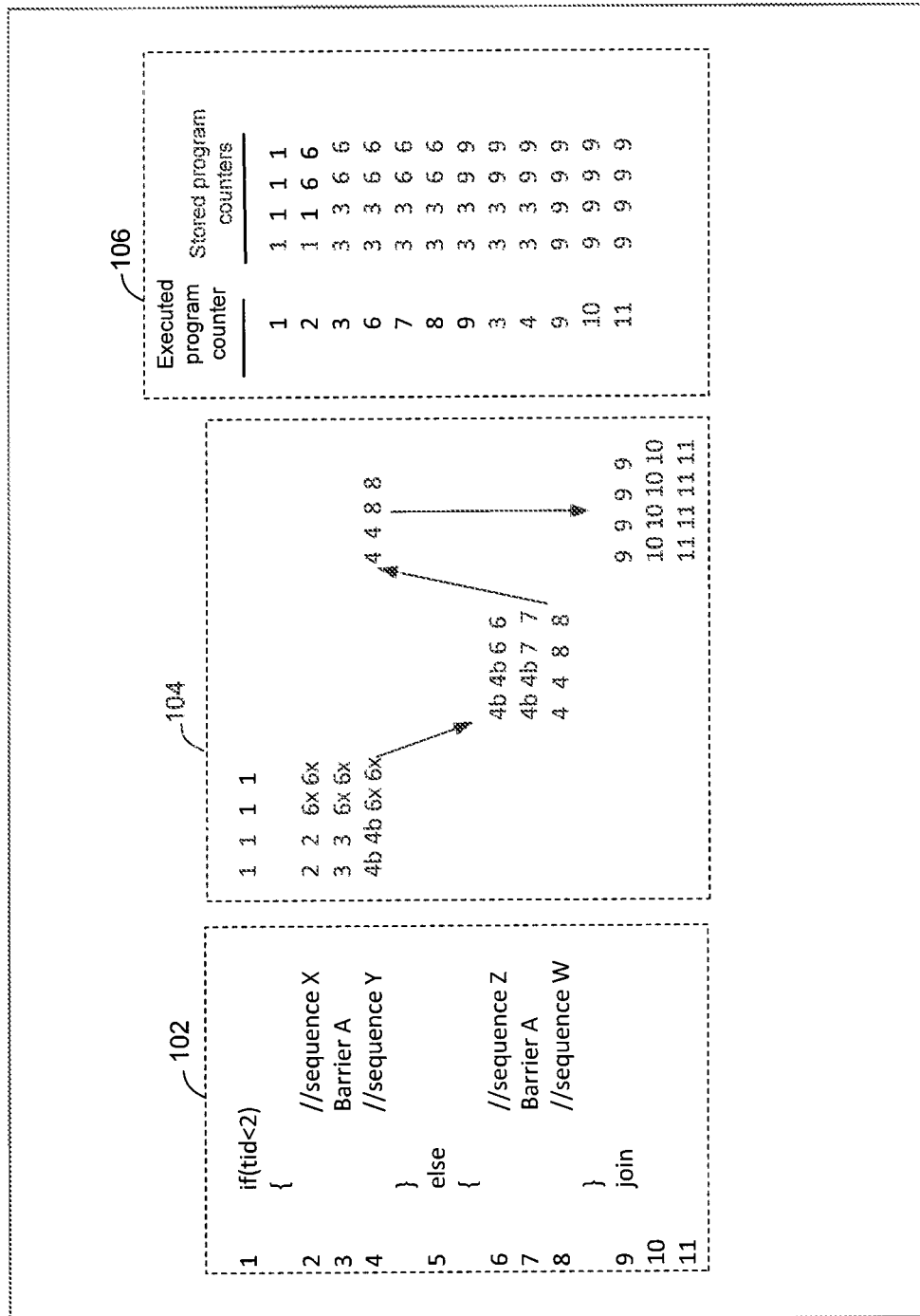
FIG. 1 illustrates an exemplary program in pseudo code and aspects of the execution environment of the program in accordance with an embodiment of the present invention.

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors. The present invention may be particularly useful where the system comprises a heterogeneous computing system. A "heterogeneous computing system," as the term is used herein, is a computing system in which multiple kinds of processors are available.

In a GPU, workitems assigned to a processing element are referred to as a "workgroup". Two or more workitems that are issued for execution in parallel in a compute unit is a "wavefront". A workgroup may comprise one or more wavefronts. Other terms for wavefront may include "warp" and "vector." Although embodiments are primarily described in relation to synchronizing workitems of a workgroup, the teachings of this disclosure may be applied to synchronize workitems across any one or more processors and/or groups of processes that have access to a shared memory. The term "kernel", as used herein, refers to a program and/or processing logic that is executed as one or more workitems in parallel having the same code base. It should be noted that, in some embodiments, the terms "workitem" and "thread" are interchangeable. The interchangeability, in this disclosure, of "workitem" and "thread" is illustrative, for example, of the flexible simulated or true independence of workitem execution embodied in the model in embodiments.

In certain embodiments of the present invention, the embodiments can significantly improve the performance of systems by enabling more efficient and more flexible synchronization between concurrent workitems. In a GPU, multi-core CPU, or other processor that executes a very large number of concurrent workitems (for example, using a SIMD or SIMT framework), the embodiments can improve efficiency by enabling workitems having divergent control flows to synchronize. The ability to synchronize over divergent control flows enables the execution of MIMD style programming on SIMD environments. Embodiments are particularly advantageous when mapping a SIMT framework onto a SIMD/vector processor.

Synchronization across divergent control flows is achieved in embodiments of the present invention by keeping track of the program counter of each workitem, and rescheduling workitems based upon the relative values of the program counters. Additionally, a synchronization and/or convergence status associated with each workitem may be considered when selecting a workitem to be executed or made runnable.

By enabling workitems to be synchronized across divergent control flows, various performance improvements and increased programming flexibility can be achieved.

The short exemplary program portion illustrated in FIG. 1 is illustrative of some of the flexibility yielded by embodiments of the present invention. Embodiments disclosed herein, by themselves, and in combination with barrier techniques disclosed in U.S. patent application Ser. No. 13/288, 833 filed on Nov. 3, 2011, incorporated by reference herein in its entirety, can yield improvements in processing speed as well as in power efficiency.

FIG. 1 illustrates an exemplary program part 102 in pseudo code and aspects of the execution environment of the program part in accordance with an embodiment of the present invention. Program part 102 illustrates an example divergent control flow through the use of an "if/else" conditional, with sequences of instructions to be executed in each of the two cases of the conditional. The instruction sequences in either portion of the conditional includes a synchronization instruction (e.g., the "barrier" instructions in 102). Outside of the conditional, a convergence instruction (e.g., the "join" instruction in 102) acts to ensure that all workitems are synchronized at the same program counter before any are allowed to proceed beyond the convergence point. The leftmost column in 102 represents the line number which can be considered as the respective value of the program counter associated with the corresponding instruction of 102 (e.g., 3 is the value of the program counter associated with the Barrier A instruction).

Item 104 illustrates the control flow of program part 102 and how the program counter associated with each of the workitems change during execution of program part 102. Each of the three columns in item 104 represent the instruction execution as the control flow changes during execution of program part 102. For discussion purposes, it is assumed that, just before instruction execution encounters the "if" conditional, program counters of workitems 0-3 are all at 1. This is represented by the topmost entry (i.e., entry [1 1 1 1]) in the left column. The four subentries in each entry illustrated in item 104, from left to right, represent the program counters of workitems 0-3. The "if" conditional causes workitems 0-1 and 2-3 to diverge, e.g., workitems 0-1 would proceed to execute instructions within the "if" condition, and workitems 2-3 would proceed to execute instructions within the "else" condition. Specifically, workitems with task identifiers less than 2 follow the "if" path, and workitems with task identifiers greater than 2 follow the "else" path. Such following of different execution paths by separate instances (e.g., workitems) of a program may be referred to as "divergent control flow."

As illustrated in the left column, instructions within the "if" portion of the conditional may be executed first. Thus, when instruction 2 is executed workitems 0-1 have their program counters at 2, and workitems 2-3 have theirs at 6 (e.g., 6 is the first instruction in the "else" portion of the conditional). The program counters of workitems 2-3 are illustrated as "$6x$" to indicate that the workitems are not currently executing. In the pseudo code, instructions 2 and several other instructions are represented as a sequence of instructions. A person of skill in the art would appreciate that this example is for illustration only, and that instruction 2 or other instruction in this example may include any number of instructions and that the exemplary program counters can be changed accordingly.

At instruction 3, workitems 0-1 encounter (reach) a synchronization point, e.g., barrier A. The [3 3 $6x$ $6x$] entry illustrates that workitems 0-1 reached the barrier at program counter 3 and that workitems 2-3, which have their program counters at 6, are not executing.

Thereafter, the entry [4b 4b 6x 6x] illustrate that the workitems 0-1, whose next instruction would be instruction 4, are currently blocked at a synchronization point and workitems 2-3 are not executing. Control flow then passes to the "else" portion of the conditional. The entry [4b 4b 6 6] in the middle column illustrates that workitems 0-1 remain blocked and that workitems 2-3 are now executing instruction 6.

Workitems 2-3 then proceed to instruction 7 (e.g., [4b 4b 7 7]) which is a synchronization point (also barrier A). Barrier A is configured to block any workitems reaching it until all workitems 0-3 have reached it. When workitems 2-3 reach barrier A, because workitems 0-1 are already blocked there, the synchronization condition associated with the barrier is satisfied and all workitems blocked at the barrier are made runnable. The workitems proceed to execute instructions following the respective barrier points (e.g., [4 4 8 8]).

Thereafter, the diverged control flows are converged at the "join" at instruction 9 (e.g., [9 9 9 9]). The convergence point at instruction 9 blocks any workitems reaching it until all workitems have reached the same point. Thereafter, the converged control flow results in each workitem 0-3 executing the same instructions.

Item 106 illustrates the actual program counter (left column of 106) and the values in the program counter registers as program part 102 is executed, according to an embodiment of the present invention.

In the illustrated embodiment, the actual instructions executed on the processor may be specified as 1, 2, 3, 6, 7, 8, 9, 3, 4, 9, 10, and 11. The selection of the instruction to execute at each stage is performed based upon the program counters of respective workitems and based upon whether workitems are currently blocked at a synchronization point or convergence point. Method 300, described below, illustrates the execution flow in more detail.

Upon encountering the divergent control flow point (e.g., the "if" conditional at instruction 1 shown in 102), the workitems store the program counter associated with the respective divergent points as described below in relation to stages 308-310 of method 300, resulting in [1 1 6 6]. Workitems 0-1 are selected to execute due to the lower program counter value. Workitems 0-1, however, encounter the synchronization point at instruction 3, store the corresponding program counter (e.g., 3) and block on the synchronization point. Encountering and blocking or a synchronization point is described below in relation to stages 316-322 of method 300. The resulting vector of program counters may be [3 3 6 6].

Control then passes to workitems 2-3, currently waiting on instruction 6. Workitems 2-3 subsequently encounter the synchronization point at instruction 7. However, with the reaching of the synchronization point by workitems 2-3, the synchronization conditions are satisfied (e.g., all workitems reached the synchronization point) and all workitems are allowed to proceed. Completing of synchronization conditions and subsequent processing is described below in relation to stage 316-326 of method 300.

Workitems 2-3 may proceed to instruction 9, a convergence point, and is blocked there, after recording the program counter. The resulting vector of program counters may be [3 3 9 9]. At this point, control is passed to workitems 0-1 that are now free from the synchronization point. Workitems 0-1 then continue execution and reach the synchronization point at instruction 9. At this point all workitems have reached the convergence point and all workitems become simultaneously runnable. Convergence point processing is described below in relation to stages 330-342 of method 300.

FIG. 2 illustrates a rescheduling (in pseudo code) for workitems, according to an embodiment of the present invention. FIG. 2 illustrates an exemplary reschedule function, and an exemplary find_lowest_runnable_pc function. The reschedule function includes instructions to schedule one or more workitems for execution. The reschedule function calls the find_lowest_runnable_pc which, as the function name suggests, finds runnable workitems with the minimum valued program counters.

The rescheduling of workitems can be based upon one or more of many characteristics of the program counters associated with the respective workitems. Finding of the one or more workitems with the minimum valued program counters is one of the techniques for selection. Other techniques, such as, finding the mode of the current program counters of the workitems may also be used for selecting the next workitems to be scheduled. Yet other techniques, such as, but not limited to, maximum program counter, program counters determined based on tree search, and the like, may also be used. It may be desired that the same selection technique is used for at least the duration of an execution of a program in order to ensure convergence.

As illustrated, the find_minimum_runnable_pc function accesses vector of program counters (e.g., a vector storing the current program counter for each workitem) and finds the one or more minimum valued entries in that vector for which the corresponding workitems are not currently blocked at a synchronization and/or convergence point. Another vector may be accessed to determine whether each workitem is currently blocked at a synchronization and/or convergence point. The determination of whether a workitem is blocked at a synchronization and/or convergence point may include checking whether the respective workitem is at a synchronization and/or convergence point, and whether the conditions for that synchronization and/or convergence point is satisfied.

The reschedule function determines the desired program counter value by calling the find_minimum_runnable_pc. It then determines and sets an execution mask that indicates to the system what workitems are currently runnable. After setting the mask, a jump to the desired program counter is implemented.

Figure 3:
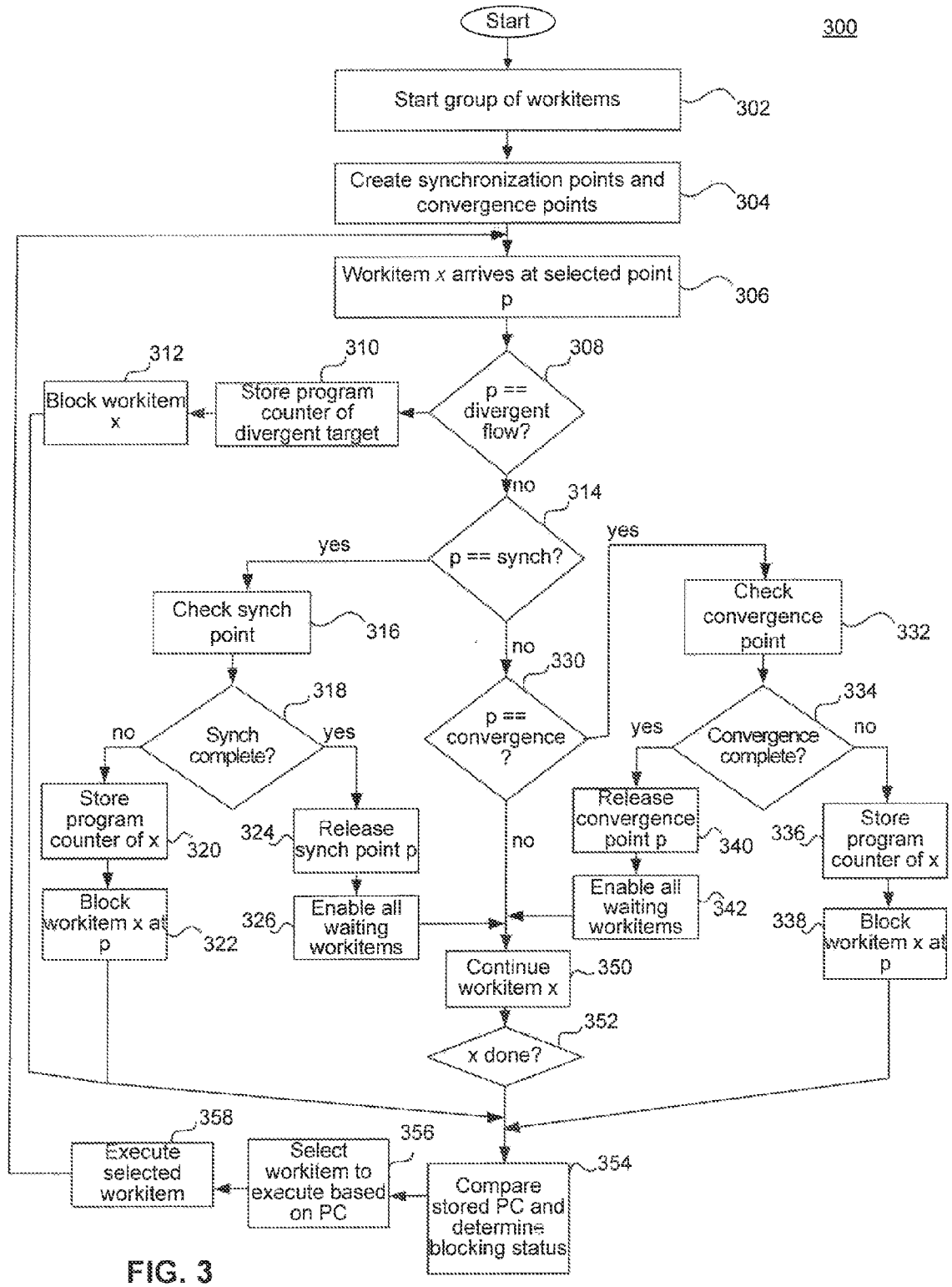
FIG. 3 illustrates a flowchart of a method for workitem synchronization, according to the embodiment.

FIG. 3 illustrates a flowchart of a method 300 for workitem synchronization, according to an embodiment. All of the steps 302-358 may not be needed, and steps 302-358 may be performed according to an ordering that is different from that illustrated in FIG. 3. Method 300 can be performed, for example, in a divergent flow synchronization module 409 which is described in relation to FIG. 4 below. Method 300 enables workitem synchronization even when divergent control flows exist.

At stage 302, a group of workitems are started on a processor. The processor may include a vector processor, SIMD processor, or a combination of vector and scalar processors. Starting a group of workitems on the processor may include setting an execution mask, such as a vector or bitmask, indicating which of the workitems are currently runnable.

At stage 304, synchronization points and convergence points are created. Synchronization points may include, but are not limited to, barriers and semaphores. According to an embodiment, synchronization points ensure that each workitem of a desired group of workitems reaches that synchronization point before any of the workitems in that group of workitems is allowed to proceed with processing instructions that follow the synchronization point. According to various embodiments, a synchronization point may be defined to synchronize all running workitems, any specified number of workitems from a group of workitems, or specific workitems from a group of workitems. The same synchronization point may occur at different locations within the program code. Thus, different program counters can be associated with the same synchronization point, thereby leading to issues when different workitems follow divergent execution flows.

Convergence points may include, but are not limited to, join and semaphores. Convergence points, like synchronization points, are used to ensure that any of a group of workitems can proceed beyond that point only when all workitems in the group have reached that convergence point. However, all workitems in the group reach that convergence point at the same program counter value. Convergence points regain execution coherence to increase performance via better utilization of SIMD/vector resources. (e.g. get as much work done per clock as possible).

Creation of the synchronization points and convergence points may include creating the data structures associated with such points. The data structures and logic associated with the synchronization and convergence points may include operations to keep track of how many workitems have reached that point and how many workitems in total are to reach the point before the conditions associated with the point are satisfied and any workitems blocked on that point are allowed to proceed. Some embodiments may include the ability to track groups or subsets of the workitems for synchronization and convergence. Some embodiments may enable one or more of the workitems to "skip" a particular synchronization point or convergence point. When a workitem skips a synchronization point or convergence point, the conditions associated with the point may be satisfied when all workitems other than the skipped workitems reach that point. U.S. patent application Ser. No. 13/288,833, filed on Nov. 3, 2011, which is hereby incorporated by reference in its entirety, discloses techniques by which synchronization points (e.g., barriers) can be implemented with skip functionality. Embodiments disclosed herein may implement synchronization points with the functionalities described in the above referenced U.S. patent application Ser. No. 13/288, 833. Convergence points, too, may be implemented in accordance with the techniques disclosed for synchronization points in the U.S. patent application Ser. No. 13/288,833. The data structures corresponding to the synchronization points and convergence points may be formed in memory, such as dynamic random access memory, static random access memory, or other type of data register.

At stage 306, one of the workitems (e.g., workitem x) arrives at a selected point. A workitem may arrive at a selected point when the current instruction in the corresponding program may be one of a divergent control flow point, a synchronization point or convergence point. Method 300 causes workitem x to react differently for each type of selected point encountered.

At stage 308, it is determined whether the point reached (p) is a divergent control flow point. Divergent control flow points include, but are not limited to, if/else conditionals, conditional loops, indirect function calls and the like that may cause some workitems to proceed in one instructions path and others to proceed in a different instruction path.

If p is a divergent control flow point, then at stage 310, the program counter for the divergent point is stored as the program counter associated with workitem x, and at stage 312 workitem x is halted in order to subsequently (e.g., see stage 354 described below) determine whether workitem x or some other workitems are to be scheduled for execution next.

If, at step 308, it is determined that p is not a divergent control flow point, then at stage 314 it is determined whether p is a synchronization point. As described above, a synchronization point may include, for example, a barrier instruction. If p is a synchronization point, then at stage 316 the data structure corresponding to that synchronization point is accessed to determine the status of the synchronization. As described above, the data structure may be formed in any type of memory or register. Checking the status of the synchronization point may include determining, at stage 318, whether the conditions associated with the particular synchronization has been satisfied with the reaching of that point by workitem x. As described above, the conditions associated with the synchronization point may include requiring that all or a specified number of workitems reach that point before any workitems are allowed to proceed beyond the synchronization point.

If, at stage 318, it is determined that the synchronization conditions have not been satisfied, then at stage 320, the program counter of workitem x is stored in a program counter register, and at stage 322, workitem x is blocked upon point p. The synchronization point p data structure may be updated to indicate that workitem x has reached p and that it is currently blocked on p.

If, at stage 318, it is determined that the synchronization conditions have not been satisfied, then at stage 324, the synchronization point p is released. The data structure corresponding to point p may be updated to indicate the release. Releasing of the synchronization point p includes, at stage 326, the enabling of workitems waiting (e.g., blocked, suspended, sleeping or otherwise halted pending the resolution of p) to a runnable state. This may include setting an execution mask indicating that the selected workitems are runnable.

If, at stage 314, it is determined that p is not a synchronization point, then at stage 330, it is determined whether p is a convergence point. As described above convergence points include, for example, a join instruction. If p is a convergence point, then at stage 332 it is determined whether the conditions associated with the convergence point has been satisfied with the arrival of workitem x at p. According to an embodiment, the checking of the convergence point (stage 332) and determining whether the convergence of point p is complete (stage 334) is performed similarly to the check performed for synchronization points (in stages 316 and 318).

If convergence at p is not complete, then at stage 336 the program counter of workitem x is stored and workitem x is blocked at point p. Stages 336 and 338 may be performed similarly to stages 320 and 322, described above in relation to synchronization point. If convergence at p is complete, then at stage 340 the convergence point is released and at stage 342 all workitems that were waiting on p are enabled as runnable. Stages 340 and 342 may be performed similarly to stages 324 and 326, described above in relation to synchronization point p.

If, subsequent to any stages 330, 326 or 342, processing reaches stage 350, the execution of workitem x continues until x is done or another selected point is reached stage 352. If a selected point is reached, then processing of method 300 proceeds to stage 306. If x completes, then stage 354 is reached. Stage 354 may also be reached from other stages including stage 312, stage 322 and stage 338.

At stage 354, the stored program counters are compared. As noted above, the program counters may be stored in any type of memory or register, and may include a vector of program counters. Each workitem may have its own program counter. It is noted that, in the embodiments described in relation to method 300, the program counter for each workitem is tracked or stored only upon reaching a selected point (e.g., divergent control flow point, synchronization point, or convergence point). Tracking the respective program counters only at selected points reduce the cost associated with the tracking. However, other embodiments may include continuously or more frequently tracking the respective program counters.

Comparing the program counters may include processing a vector of program counters to determine one or more program counter values that satisfy a predetermined characteristic. According to an embodiment, the minimum of the program counter values are determined. The pseudocode illustrated in FIG. 2, for example, determines the workitems with the minimum valued program counters. In another embodiment, the mode of the program counter values may be determined. As noted above, other characteristics, such as, but not limited to, a maximum, a midpoint, and the like may be used.

At stage 354, it is also determined whether the workitems with the desired program counter characteristics are currently runnable. Checking runnability of workitems may include accessing data structures associated with synchronization and/or convergence points. According to an embodiment, it is determined whether the workitems being considered are currently blocked at either a synchronization point or a convergence point. Thus, the output of stage 354 is a set of selected workitems.

At stage 356, the set of selected workitems is marked as runnable. The marking of workitems as runnable may include setting an execution mask indicating the workitems that are runnable.

At stage 358, the set of selected workitems are executed. Execution may be performed by causing the program counter to jump to the program counter associated with the selected set of workitems. FIG. 2 illustrated executing a selected set of workitems according to an embodiment.

Figure 4:
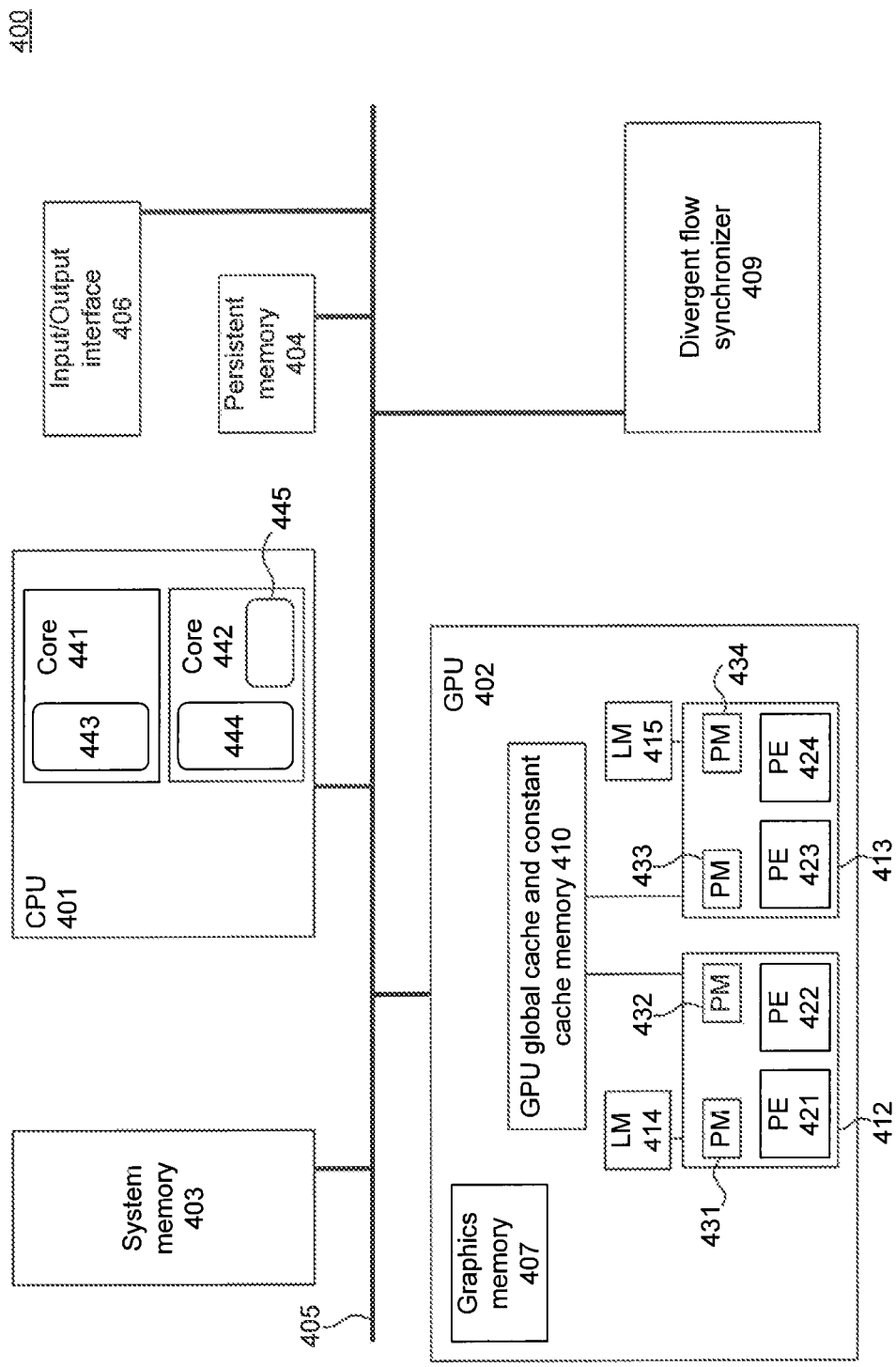
FIG. 4 illustrates a block diagram of a system for workitem synchronization, according to an embodiment.

FIG. 4 is a block diagram illustration of a system for workitem synchronization in accordance with an embodiment. In FIG. 4, an example heterogeneous computing system 400 can include one or more CPUs, such as CPU 401, and one or more GPUs, such as GPU 402. Heterogeneous computing system 400 can also include system memory 403, persistent storage device 404, system bus 405, an input/output device 406, and a divergent flow synchronizer 409.

CPU 401 can include a commercially available control processor or a custom control processor. CPU 401, for example, executes the control logic that controls the operation of heterogeneous computing system 400. CPU 401 can be a multi-core CPU, such as a multi-core CPU with two CPU cores 441 and 442. CPU 401, in addition to any control circuitry, includes CPU cache memories 443 and 444 of CPU cores 441 and 442, respectively. CPU cache memories 443 and 444 can be used to temporarily store instructions and/or parameter values during the execution of an application on CPU cores 441 and 442, respectively.

For example, CPU cache memory 443 can be used to temporarily store one or more control logic instructions, values of variables, or values of constant parameters, from the system memory 403 during the execution of control logic instructions on CPU core 441. CPU 401 can also include specialized vector instruction processing units. For example, CPU core 442 can include a Streaming SIMD Extensions (SSE) unit that can efficiently process vectored instructions. A person skilled in the art will understand that CPU 401 can include more or less CPU cores than shown in the example, and can also have either no cache memories or more complex cache memory hierarchies.

GPU 402 can include a commercially available graphics processor or custom designed graphics processor. GPU 402, for example, can execute specialized code for selected functions. In general, GPU 402 can be used to execute graphics functions such as graphics pipeline computations and rendering of image on a display.

GPU 402 includes a GPU global cache memory 410 and one or more compute units 412 and 413. A graphics memory 404 can be included in, or coupled to, GPU 402. Each compute unit 412 and 413 are associated with a GPU local memory 414 and 415, respectively. Each compute unit includes one or more GPU processing elements (PE). For example, compute unit 412 includes GPU processing elements 421 and 422, and compute unit 413 includes GPU PEs 423 and 424.

Each GPU processing element 421, 422, 423, and 424, is associated with at least one private memory (PM) 431, 432, 433, and 434, respectively. Each GPU PE can include one or more of a scalar and vector floating-point units. The GPU PEs can also include special purpose units such as inverse-square root units and sine/cosine units. GPU global cache memory 410 can be coupled to a system memory such as system memory 403, and/or graphics memory such as graphics memory 407.

System memory 403 can include at least one non-persistent memory such as dynamic random access memory (DRAM). System memory 403 can store processing logic instructions, constant values and variable values during execution of portions of applications or other processing logic. For example, the control logic and/or other processing logic of divergent flow synchronizer 409 can reside within system memory 403 during execution of divergent flow synchronizer 409 by CPU 401. The term "processing logic," as used herein, refers to control flow instructions, instructions for performing computations, and instructions for associated access to resources.

Persistent memory 404 includes one or more storage devices capable of storing digital data such as magnetic disk, optical disk, or flash memory. Persistent memory 404 can, for example, store at least parts of instruction logic of divergent flow synchronizer 409. At the startup of heterogeneous computing system 400, the operating system and other application software can be loaded in to system memory 403 from persistent storage 404.

System bus 405 can include a Peripheral Component Interconnect (PCI) bus, Industry Standard Architecture (ISA) bus, or such a device. System bus 405 can also include a network such as a local area network (LAN), along with the functionality to couple components, including components of heterogeneous computing system 400.

Input/output interface 406 includes one or more interfaces connecting user input/output devices such as keyboard, mouse, display and/or touch screen. For example, user input can be provided through a keyboard and mouse connected user interface 406 to heterogeneous computing system 400. The output of heterogeneous computing system 400 can be output to a display through user interface 406.

Graphics memory 407 is coupled to system bus 405 and to GPU 402. Graphics memory 407 is, in general, used to store data transferred from system memory 403 for fast access by the GPU. For example, the interface between GPU 402 and graphics memory 407 can be several times faster than the system bus interface 405.

Divergent flow synchronizer 409 includes logic to synchronize functions and processing logic on either GPU 402 or CPU 401. Divergent flow synchronizer 409 may be configured to synchronize workitems in each individual processor and/or within each processing element of a processor. Divergent flow synchronizer 409 is further described in relation to FIG. 5 below. A person of skill in the art will understand that divergent flow synchronizer 409 can be implemented using software, firmware, hardware, or any combination thereof. When implemented in software, for example, divergent flow synchronizer 409 can be a computer program written in C or OpenCL, that when compiled and executing resides in system memory 403. In source code form and/or compiled executable form, divergent flow synchronizer 409 can be stored in persistent memory 404. In one embodiment, some or all of the functionality of divergent flow synchronizer 409 is specified in a hardware description language such as Verilog, RTL, netlists, to enable ultimately configuring a manufacturing process through the generation of maskworks/photomasks to generate a hardware device embodying aspects of the invention described herein.

A person of skill in the art will understand that heterogeneous computing system 400 can include more or less components that shown in FIG. 4. For example, heterogeneous computing system 400 can include one or more network interfaces, and or software applications such as the OpenCL framework.

Figure 5:
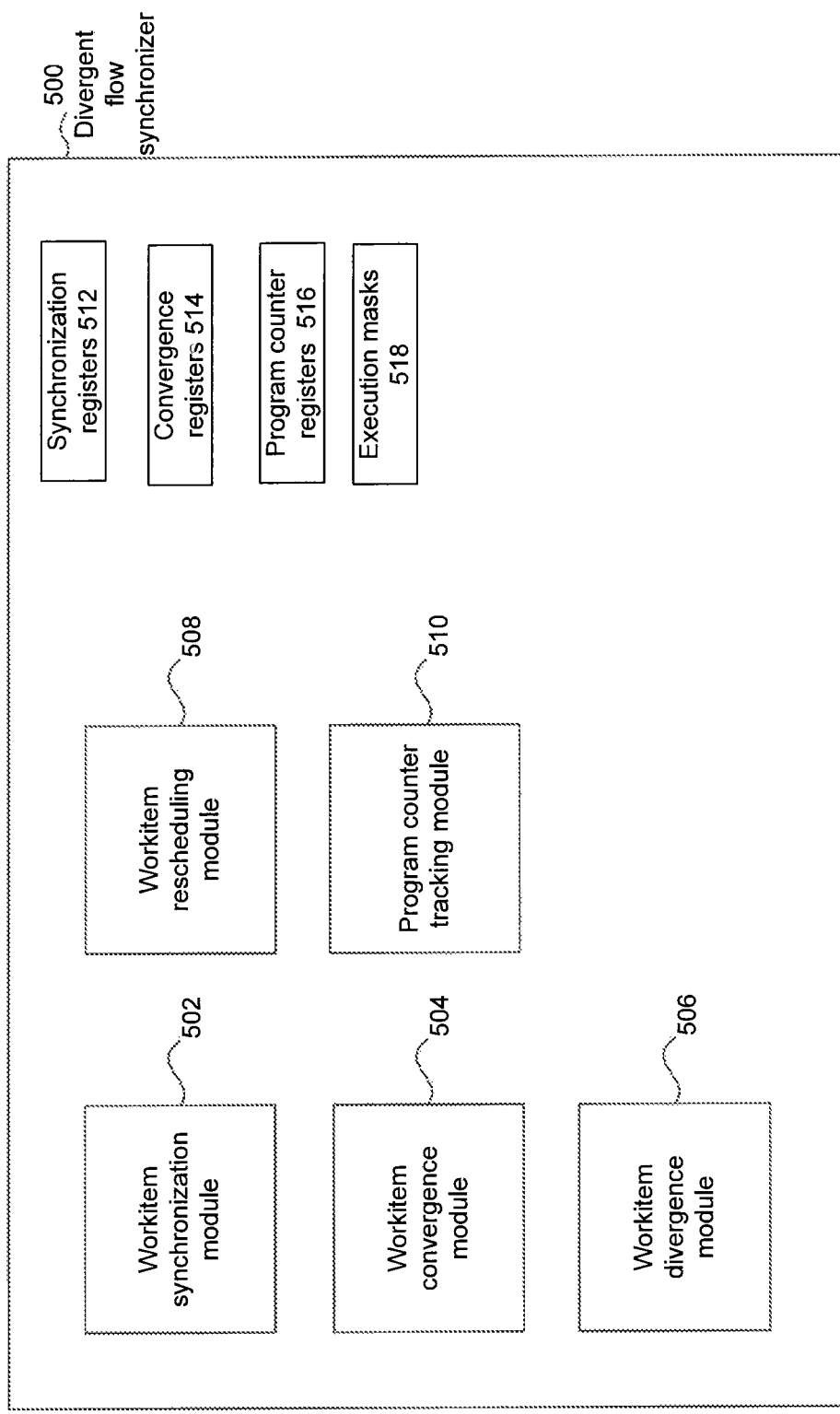
FIG. 5 illustrates a block diagram of a workitem synchronization module, according to an embodiment.

FIG. 5 is an illustration of divergent flow synchronizer 500, according to an embodiment. Divergent flow synchronizer 500 includes a workitem synchronization module 502, a workitem convergence module 504, a workitem divergence module 506, a workitem rescheduling module 508, and a program counter tracking module 510. Moreover, divergent flow synchronizer 500 can include synchronization registers 512, convergence registers 514, program counter registers 516, and execution masks 518. According to an embodiment, divergent flow synchronizer 500 is included in divergent flow synchronizer 409.

Workitem synchronization module 502 may operate to determine whether a particular instruction is a synchronization point and to implement the processing associated with a workitem reaching a synchronization point. According to an embodiment, workitem synchronization module 502 may include the logic associated with processing stages 314-326 described above in relation to method 300.

Workitem convergence module 504 may operate to determine whether a particular instruction is a convergence point and to implement the processing associated with a workitem reaching a convergence point. According to an embodiment, workitem convergence module 504 may include the logic associated with processing stages 330-342 described above in relation to method 300.

Workitem divergence module 506 may operate to determine whether a particular instruction is a divergent control flow point and to implement the processing associated with a workitem reaching a divergent control flow point. According to an embodiment, workitem divergence module 506 may include the logic associated with processing stages 308-312 described above in relation to method 300.

Workitem rescheduling module 508 operates to select workitems to be executed next and to enable them for execution. With the assistance of the program counter tracking module 510, workitem rescheduling module 508 may schedule a set of selected workitems to be execute next, and may initiate the execution. The selected set of workitems may have a program counter value that satisfy a predetermined criteria and may also be determined as not being currently blocked at a synchronization point or a convergence point. According to an embodiment, workitem rescheduling module 508 may include the logic associated with processing stages 354-358 described above in relation to method 300.

Program counter tracking module 510 operates to track and/or store program counter values associated with the respective workitems. Program counter tracking module 510 may also include some or all of the functionality to determine workitems that satisfy a predetermined set of characteristics in the stored program counter. As noted above, the program counters may be tracked only at selected points, such as, divergent control flow points, synchronization points and convergence points, or may be more frequently tracked. According to an embodiment, program counter tracking module 510 may assist in performing stages 310, 320, 336, and 354.

Synchronization registers 512 may be one or more data structures formed in any type of memory and/or using hardware registers. Synchronization registers 512 maintain the status of each synchronization point. In some embodiments, synchronization registers 512 maintains the status of each workitem in relation to the synchronization point.

Convergence registers 514 may be one or more data structures formed in any type of memory and/or using hardware registers. Convergence registers 514 maintain the status of each convergence point. In some embodiments, convergence registers 514 maintains the status of each workitem in relation to the synchronization point.

Program counter registers 516 may be one or more data structures formed in any type of memory and/or using hardware registers. Program counter registers 516 stores the program counter values for the respective workitems.

Execution masks 518 may be one or more data structures formed in any type of memory and/or using hardware registers. Execution masks 518 may be utilized to indicate which of the workitems are currently runnable.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of synchronizing a group of a plurality of workitems on a processor, each of the plurality of workitems being associated with a program counter, the method comprising:
    determining a divergent control flow point, a synchronization control point, and a convergence point associated with at least one of the plurality of workitems;

writing a value of the program counter of the determined divergent control flow point, synchronization point, and convergence point to a memory location associated with the at least one of the plurality of workitems; and
selecting at least one first workitem from the plurality of workitems based upon a comparison of values of the program counter that have been written to memory, wherein the selecting includes executing divergent control flow in one or more of the workitems based at least on the comparison.

2. The method of claim 1, further comprising:
storing the respective program counter associated with each of the workitems.

3. The method of claim 2, wherein the storing comprises:
halting execution of at least one of the workitems upon reaching a convergence point or a synchronization point; and
writing a value of a program counter of the halted at least one of the workitems to a memory location.

4. The method of claim 2, wherein the storing comprises:
storing the respective program counter only at one or more selected points in respective instruction streams.

5. The method of claim 4, wherein the one or more selected points include only one or more of divergent control flow points, synchronization points, and convergence points.

6. The method of claim 1, wherein the selecting at least one first workitem comprises:
selecting the at least one first workitem from the group based upon the value of the stored program counter associated with the at least one first workitem; and
executing the selected at least one workitem.

7. The method of claim 1, further comprising:
reaching a synchronization point in executing at least one second workitem from the group of workitems;
determining, based upon values stored in one or more synchronization tracking registers, that a synchronization condition corresponding to the synchronization point is not satisfied;
updating the one or more synchronization tracking registers to indicate reaching the synchronization point; and
causing the at least one second workitem to wait upon the synchronization point,
wherein the storing a respective program counter includes storing a program counter associated with the at least one second workitem.

8. The method of claim 7, wherein the selecting further comprises:
determining that the at least one first workitem is not currently waiting upon a synchronization point.

9. The method of claim 7, wherein the predetermined characteristic is a lowest value relative to the other stored program counters.

10. The method of claim 7, wherein the predetermined characteristic is a mode value.

11. The method of claim 1, further comprising:
reaching a convergence point in executing at least one second workitem from the group of workitems;
determining, based upon values stored in one or more convergence tracking registers, that a convergence condition corresponding to the convergence point is not satisfied;
updating the one or more convergence tracking registers to indicate reaching the convergence point; and
causing the at least one second workitem to wait upon the convergence point,
wherein the storing a respective program counter includes storing a program counter associated with the at least one second workitem.

12. The method of claim 1, wherein the selecting comprises:
comparing the stored program counter associated with the at least one first workitem to one or more other said stored program counters; and
determining the stored program counter associated with the at least one first workitem as having a predetermined characteristic relative to the one or more other stored program counters.

13. The method of claim 1, wherein the group of workitems is a workgroup and the workgroup is executing in a processing element of a single instruction multiple data (SIMD) processing unit.

14. The method of claim 1, wherein the group includes workitems from two or more wavefronts of a workgroup executing in a SIMD processing unit.

15. The method of claim 1, wherein control flow of one or more of the workitems include instructions included from a library function.

16. A system, comprising:
a processor;
a group of a plurality of workitems executing on the processor, each of the plurality of workitems being associated with a program counter; and
a divergent flow synchronization module that, in response to being executed by the processor, is configured to cause the processor to:
determine divergent control flow point, a synchronization control point, and a convergence point associated with at least one of the plurality of workitems,
write a value of the program counter of the determined divergent control flow point, synchronization point, and convergence point to a memory location associated with the at least one of the plurality of workitems, and
select at least one first workitem from the group to execute based upon a comparison of values of the program counter that have been written to memory, wherein the selecting includes executing divergent control flow in one or more of the workitems based at least on the comparison.

17. The system of claim 16, wherein the processor is a vector processor.

18. The system of claim 16, wherein the divergent flow synchronization module is further configured to select the at least one first workitem for execution by:
comparing the program counter associated with the at least one first workitem to one or more other program counters that have been written to the memory; and
determining the program counter associated with the at least one first workitem as having a predetermined characteristic relative to the one or more other respective program counters.

19. The system of claim 16, wherein the divergent flow synchronization module is further configured to cause the processor to:
store the respective program counter associated with each of the workitems.

20. The system of claim 16, wherein the divergent flow synchronization module is further configured to cause the processor to:
halt execution of at least one of the workitems upon reaching a convergence point or a synchronization point; and write a value of a program counter of the halted at least one of the workitems to a memory location.

21. The system of claim 16, wherein the divergent flow synchronization module is further configured to cause the processor to:
store the respective program counter only at one or more selected points in respective instruction streams.

22. The system of claim 16, wherein the divergent flow synchronization module is further configured to cause the processor to:
reach a synchronization point in executing at least one second workitem from the group of workitems;
determine, based upon values stored in one or more synchronization tracking registers, that a synchronization condition corresponding to the synchronization point is not satisfied;
update the one or more synchronization tracking registers to indicate reaching the synchronization point; and
cause the at least one second workitem to wait upon the synchronization point,
wherein the storing a respective program counter includes storing a program counter associated with the at least one second workitem.

23. The system of claim 16, wherein the divergent flow synchronization module is further configured to cause the processor to:
reach a convergence point in executing at least one second workitem from the group of workitems;
determine, based upon values stored in one or more convergence tracking registers, that a convergence condition corresponding to the convergence point is not satisfied;
update the one or more convergence tracking registers to indicate reaching the convergence point; and
cause the at least one second workitem to wait upon the convergence point,
wherein the storing a respective program counter includes storing a program counter associated with the at least one second workitem.

24. A non-transitory computer readable storage medium having instructions encoded thereon, execution of which by a processor cause execution of a method of synchronizing a group of a plurality of workitems, each of the plurality of workitems being associated with a program counter, the method including operations comprising:
determining a divergent control flow point, a synchronization control point, and a convergence point associated with at least one of the plurality of workitems;
writing a value of the program counter of the determined divergent control flow point, synchronization control point, and convergence point to a memory location associated with the at least one of the plurality of workitems; and
selecting a first workitem from the plurality of workitems to execute based upon a comparison of values of the program counter that have been written to memory, wherein the selecting includes executing divergent control flow in one or more of the workitems based at least on the comparison.

* * * * *